D. F. PERKINSON.
Cow-Milker.
No. 206,820. Patented Aug. 6, 1878.
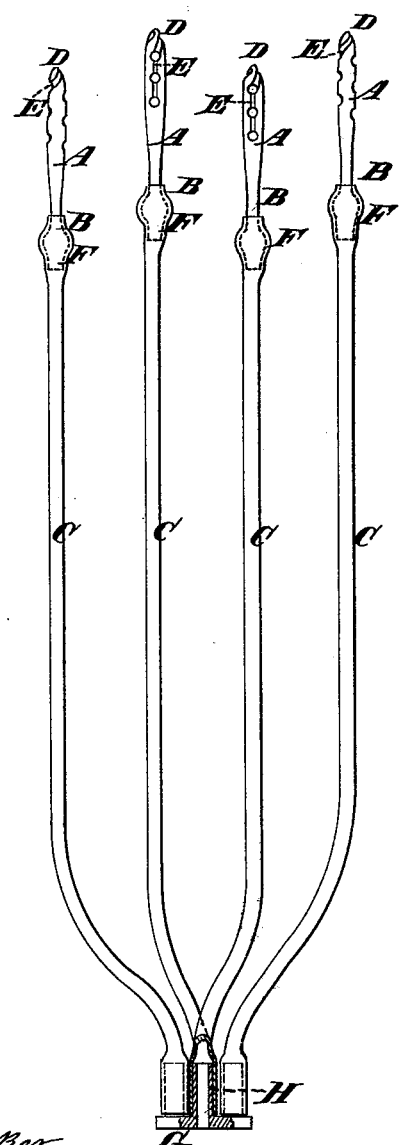
Fig. 1.
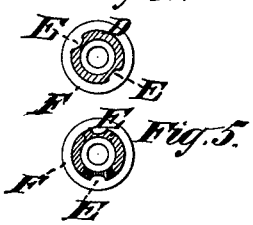
Fig. 3.
Fig. 4.
Fig. 5.
Fig. 2.
Witnesses
John Becker
Fred Hayne
Inventor
D. F. Perkinson
by his Attorneys
Brown & Allen

UNITED STATES PATENT OFFICE.

DAVID F. PERKINSON, OF NEW YORK, N. Y., ASSIGNOR TO WILLIAM F. GEORGE, OF SAME PLACE.

IMPROVEMENT IN COW-MILKERS.

Specification forming part of Letters Patent No. 206,820, dated August 6, 1878; application filed June 29, 1878.

*To all whom it may concern:*

Be it known that I, DAVID F. PERKINSON, of the city and State of New York, have invented an Improvement in Apparatus for Milking Cows and other animals; and I do hereby declare that the following is a full, clear, and exact description of the same, reference being had to the accompanying drawing, forming part of this specification.

The invention relates to that class of milking apparatus in which the milking is performed by tubes inserted in the teats of the animal to be milked.

The invention consists in a teat-tube having an exterior channel or channels communicating with the holes in the teat-tube, and also in a club-shaped teat-tube swelling toward the extremity of the same which enters farthest into the teat, and having in its exterior a channel or channels for accelerating the flow of milk from the teat, substantially as hereinafter described.

Figure 1 in the drawing represents a side view and partial section of the apparatus constructed in accordance with my invention. Fig. 2 is a detail, showing that part of the apparatus for holding the ends of the rubber tubes distended for holding the same together, as hereinafter described. Fig. 3 is a partial side view and partial section of one of the teat-tubes constructed in accordance with my invention. Figs. 4 and 5 are respectively sections on the lines $x\ x$ and $y\ y$ in Fig. 3.

A represents the teat-tubes, or tubes which in use are inserted into the teats of the animal to be milked. The said tubes are made club-shaped or swelling from the point of the attachment of the rubber tubes C to the said teat-tubes, which point of attachment is shown at B. The swell of the said tubes increases from the said point of attachment to a point near the extremity D of each teat-tube, and the said tubes have their said extremities D rounded off in such manner that they may be inserted into the teats of the animal to be milked without in the least annoying the said animal.

I have found by experiment that the said club-shaped tubes materially hasten the discharge of the milk from the udders of cows, as compared with tubes made of equal size throughout, and that the operation of milking can be performed much quicker with this kind of teat-tube than it can be with tubes heretofore used for this purpose.

In the sides of that part of each teat-tube which is, in use, inserted in the teat I provide holes for the passage of the milk into the interior of the said teat-tubes; and in the exterior of the said teat-tubes I form channels E, leading to and communicating with the said holes. The purpose of this construction is to hasten the flow of milk from the udder, as the milk-duct in the teat does not close down so tightly against the bottoms of the said channels as it does upon other parts of the exterior of the said tubes. The milk therefore meets with less resistance in passing through between the walls of the milk-duct and the exterior of the tubes than when the tube is made without the said depressions or channels. I prefer to make the said channels of spiral form, and to extend the same out to the extremities of the tubes, as shown in the drawing; but I do not confine myself strictly to this construction, neither do I limit myself to any number of channels or holes communicating with the said channels, as the tubes may in these respects be much varied without in any way departing from the spirit of the invention.

The tubes are, preferably, provided with bulbs F, for the convenient and secure attachment of the flexible elastic tubes C; but this feature of construction forms no part of the present invention. It is important that the ends of the said tubes, through which the milk finally issues, should be kept distended, and that they should be brought and held so near together that the milk from all of them may be received into a common receptacle with convenience. To effect this result there have been in some instances separate short pieces of rigid tubing inserted into the ends of the said tubes, and the ends have thereafter been brought together and held by a clasp or ferrule placed outside of all the tubes in the apparatus. This arrangement is too expensive, and it is not easily applied, as the short pieces of tubing inserted in the ends of the flexible elastic tubes are difficult to take out and replace for cleaning, and the ferrule or clasp is also troublesome in the same manner.

I avoid these defects by attaching nipples for the distension of the rubber tubes to a plate or disk, hereinafter described, by which means I obviate the necessity of a clasp or ferrule, and at the same time furnish a cheap and efficient means for holding the said ends of the said rubber tubes together, and also supply a means for easily taking out and inserting the distending-nipples, as hereinafter set forth.

G in the drawing represents the plate or disk to which the distending-nipples H are attached, the said plate or disk and the said nipples being preferably, but not necessarily, formed by casting in a single piece. This not only cheapens the apparatus, but the said plate or disk affords a ready means for taking out or inserting the said nipples in the ends of the said rubber tubes, and it also forms an excellent means for assembling the ends of the said tubes and holding them together for the purpose hereinbefore recited.

Having thus described my invention, what I claim as new, and desire to secure by Letters Patent, is as follows:

1. The teat-tube having the exterior channel or channels E communicating with the holes in the said tube, substantially as and for the purpose specified.

2. A club-shaped teat-tube, or teat-tube swelling toward the extremity D of the same, and having in its exterior a channel or channels, E, substantially as and for the purpose specified.

D. F. PERKINSON.

Witnesses:
 T. J. KEANE,
 JAMES L. NORRIS.